US009654756B1

(12) United States Patent
Richards et al.

(10) Patent No.: US 9,654,756 B1
(45) Date of Patent: May 16, 2017

(54) METHOD AND APPARATUS FOR INTERPOLATING PIXEL COLORS FROM COLOR AND PANCHROMATIC CHANNELS TO COLOR CHANNELS

(71) Applicant: Motorola Mobility LLC, Chicago, IL (US)

(72) Inventors: By-Her W Richards, Lincolnshire, IL (US); John C Pincenti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/942,082

(22) Filed: Nov. 16, 2015

(51) Int. Cl.
H04N 9/04 (2006.01)
H04N 9/77 (2006.01)
H04N 9/73 (2006.01)

(52) U.S. Cl.
CPC ............ *H04N 9/735* (2013.01); *H04N 9/045* (2013.01); *H04N 9/77* (2013.01)

(58) Field of Classification Search
CPC   H04N 9/045; H04N 9/68; H04N 9/73; H04N 9/735; H04N 9/77
See application file for complete search history.

(56) References Cited

U.S. PATENT DOCUMENTS

| 7,414,630 | B2 * | 8/2008 | Schweng | H04N 9/045 345/589 |
| 9,183,798 | B2 * | 11/2015 | Ishii | G09G 3/3607 |
| 2005/0285955 | A1 * | 12/2005 | Utz | H04N 9/045 348/265 |
| 2012/0281009 | A1 * | 11/2012 | Ward | H04N 9/67 345/589 |

* cited by examiner

Primary Examiner — Daniel M Pasiewicz
(74) Attorney, Agent, or Firm — Matthew C. Loppnow; Watson Intellectual Property Group

(57) ABSTRACT

Panchromatic pixels and chromatic pixels are interpolated into color channels per pixel of an output image. First, panchromatic pixels and chromatic pixels are used to generate an intermediate image with panchromatic channel, and color channels per pixel. At least three color channels of a first color space can be converted to a first panchromatic light intensity channel in a second color space and at least two first chrominance channels in the second color space based on a detected correlated color temperature. A ratio per pixel between the first panchromatic light intensity channel in the second color space and a second panchromatic light intensity channel in the second color space can be calculated, where the second panchromatic light intensity channel can be based on a panchromatic value per pixel. The ratio can be applied to the at least two first chrominance channels per pixel to determine pixel values in at least two second chrominance channels of the second color space. Channels per pixel can be converted from the second color space including the at least two second chrominance channels and the second panchromatic light intensity channel to a color space.

20 Claims, 7 Drawing Sheets

METHOD AND APPARATUS FOR INTERPOLATING PIXEL COLORS FROM COLOR AND PANCHROMATIC CHANNELS TO COLOR CHANNELS

BACKGROUND

1. Field

The present disclosure is directed to a method and apparatus for interpolating pixel colors from color and panchromatic channels to color channels. In particular, the present disclosure is directed to a method and apparatus for interpolating pixel colors from color and panchromatic channels to color channels based on a detected color temperature.

2. Introduction

Presently, people enjoy taking pictures of friends, family, children, vacations, flowers, landscapes, and other scenes using digital cameras. Some cameras now use panchromatic, such as Clear (C), pixels along with chromatic pixels, such as Red, Green, and Blue (RGB) pixels for improved image quality. For example, in a single or multiple camera system, panchromatic pixels may be included to reduce low-light noise, and to increase dynamic range on an output RGB image, because the spectral response of panchromatic pixels is higher than that of chromatic pixels. These result in four channels, such as RGBC channels, of RAW data in input image data, but there are only three channels of RGB or YCbCr data in output image data. An operation of color interpolation is necessary to convert the four channels to three channels, such as the RGB or YCbCr channels.

Different types of light sources provide different color temperatures of scenes. Such different types of light sources include Halogen light, sunlight, fluorescent light, tungsten light, and other types of light sources that produce a color temperature of a scene. This color temperature of a scene affects the color interpolation. However, present approaches do not take the color temperature into account for the color interpolation, which results in a suboptimal final image. Thus, there is a need for a method and apparatus for interpolating pixel colors from color and panchromatic channels to color channels based on a detected color temperature.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for interpolating pixel colors from color and panchromatic channels to color channels based on a detected color temperature. According to a possible embodiment, at least one image of a scene can be captured using chromatic pixels that use a first color space and using panchromatic pixels, where the chromatic pixels and the panchromatic pixels can be on at least one image sensor. A correlated color temperature of the scene can be detected. Chromatic pixel values of the chromatic pixels and a panchromatic pixel value of the panchromatic pixels can be interpolated per pixel to generate a merged image including at least three color channels in the first color space and a panchromatic channel in the first color space. The at least three color channels of the first color space can be converted to a first panchromatic light intensity channel in a second color space and at least two first chrominance channels in the second color space based on the detected correlated color temperature. A ratio per pixel between the first panchromatic light intensity channel in the second color space and a second panchromatic light intensity channel in the second color space can be calculated, where the second panchromatic light intensity channel can be based on the panchromatic value per pixel. The ratio can be applied to the at least two first chrominance channels per pixel to determine pixel values in at least two second chrominance channels of the second color space. Channels per pixel can be converted from the second color space including the at least two second chrominance channels and the second panchromatic light intensity channel to the first color space and/or a third color space.

Figure 1:
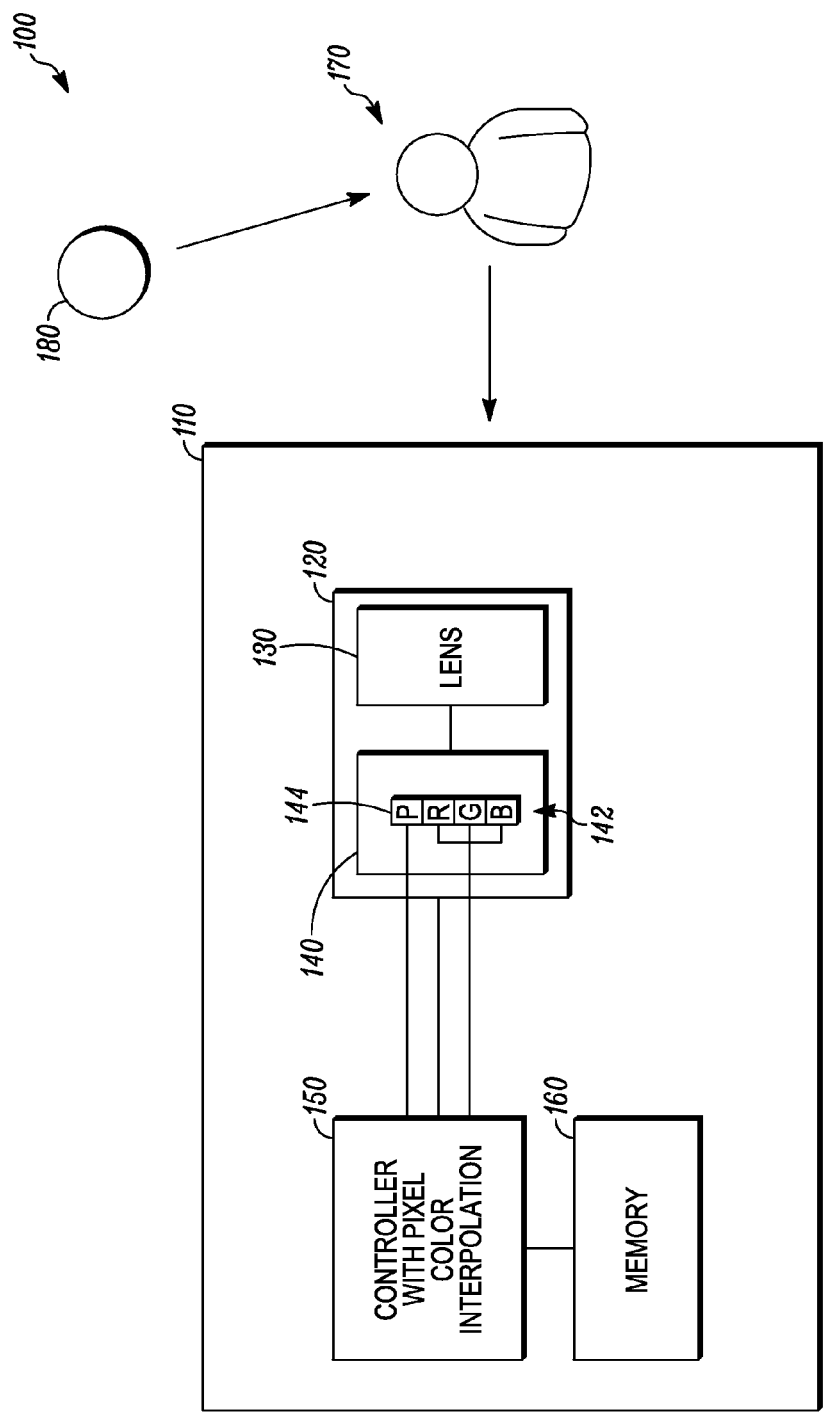
FIG. 1 is an example illustration of a system according to a possible embodiment.

FIG. 1 is an example illustration of a system 100 according to a possible embodiment. The system 100 can include an apparatus 110 and a scene 170 illuminated by a light source 180, such as an illuminant. The apparatus 110 can be a compact camera, a Digital Single Lens Reflex (DSLR) camera, a mirrorless camera, a smartphone, a cellular telephone, a selective call receiver, a gaming device, a set-top box, a wearable device, a wristwatch, a camcorder, a tablet computer, a personal computer, or any other apparatus that can include a camera unit. For example, the apparatus 100 can include at least one camera unit 120, a controller 150 that includes pixel color interpolation logic, and a memory 160. The controller 150 can be a processor, an image signal processor, a separate processor and image processing pipeline module, software, hardware, one unit, multiple units, a cloud computing unit, or any other controller that can control operations on an apparatus including at least one camera unit. The camera unit 120 can include a lens 130 and at least one sensor 140. The sensor 140 can be a semiconductor Charge-Coupled Device (CCD) sensor, a Complementary Metal-Oxide-Semiconductor (CMOS) sensor, an N-type Metal-Oxide-Semiconductor (NMOS) sensor, or any other sensor that can capture an image. The sensor 140 can include chromatic pixels 142 that use a first color space and panchromatic pixels 144. The chromatic pixels can include the Red, Green, and Blue (RGB) pixels as shown or can include any other type of chromatic pixels, such as Cyan, Yellow, Green, Magenta (CYGM) pixels, or any other chromatic pixels. The panchromatic pixels 144 can be clear pixels that can sense all visible light. Only one set of a combination of chromatic 142 and panchromatic 144 pixels is shown for illustrative purposes, but it is understood that the sensor 140 can include millions of pixels.

In operation, the sensor 140 can capture at least one image of the scene 170 using the chromatic pixels and the panchromatic pixels. The controller 150 can detect a correlated color temperature of the scene, such as based on the light source 180. The controller 150 can interpolate chromatic pixel values of the chromatic pixels 142 and a panchromatic pixel value of the panchromatic pixels 144 per pixel to generate a merged image including at least three color channels in the first color space and a panchromatic channel in the first color space. The controller 150 can convert the at least three color channels of the first color space to a first panchromatic light intensity channel in a second color space and at least two first chrominance channels in the second color space based on the detected correlated color temperature. The controller 150 can calculate a ratio per pixel between the first panchromatic light intensity channel in the second color space and a second panchromatic light intensity channel in the second color space, where the second panchromatic light intensity channel can be based on the panchromatic value per pixel in the first color space. The controller 150 can apply the ratio to the at least two first chrominance channels per pixel to determine pixel values in at least two second chrominance channels of the second color space. The controller 150 can convert channels per pixel from the second color space including the at least two second chrominance channels and the second panchromatic light intensity channel to the first color space and/or a third color space.

For example, embodiments can provide an approach to include a detected color temperature of a scene into color interpolation from Red, Green, Blue, and Clear (RGBC) to RGB. First, by using the preview frames, an auto white balance algorithm in an Image Signal Processor (ISP), such as the controller 150, can detect the color temperature of a scene, such as 6500 K for sunlight, 4000 K for indoor office lighting, or 2800 K for Halogen lamps in a restaurant, and other color temperatures. Based on the detected color temperature of the scene, white balance gains of RGB channels can be known. Then, white balance gains can be applied to RGB channels, but not necessarily to the clear channel C. In a third step, the intensity level in the Clear channel can be considered the luminance channel of any color space at the detected color temperature, such as Y in CIE XYZ or in CIE Yuv. For the brightness channel, such as L* in CIE L*a*b* or CIE L*C*H*, a standard formula can be used to convert the luminance channel to the brightness channel. Therefore, the intensity level of clear pixels can be converted to the brightness channel in CIE L*a*b* or CIE L*C*H*. In a fourth step, based on the intensity levels in the RGB channels, data in the luminance channel and chrominance channels of any chosen color space, such as CIE XYZ, CIE L*a*b*, or CIE L*C*H*, can be derived at the detected color temperature. Before the color space conversion, intensity levels of RGBC channels per pixel can be generated by using any necessary image processing steps, and in a linear gamma domain. The ratio in the luminance channel or brightness channel between the third and fourth steps can be calculated. Then, this ratio can be used to scale the value in chrominance channels in the second color space. At the detected color temperature, per pixel, the value in the clear channel can be used for the luminance channel or brightness channel and the scaled values can be used for the chrominance channels. Values from any chosen color space, such as CIE XYZ, can be converted to another color space, such as RGB, based on the detected color temperature of the scene.

Then, standard conversion formulas can be used to convert the resulting color space, such as RGB, to another color space, such as YCbCr. The YCbCr data format can be used for JPEG encoding, if the output image format is for JPEG. In general, there are still more image processing steps on the output RGB image, after the pixel color interpolation, before the JPEG encoding.

Figure 2:
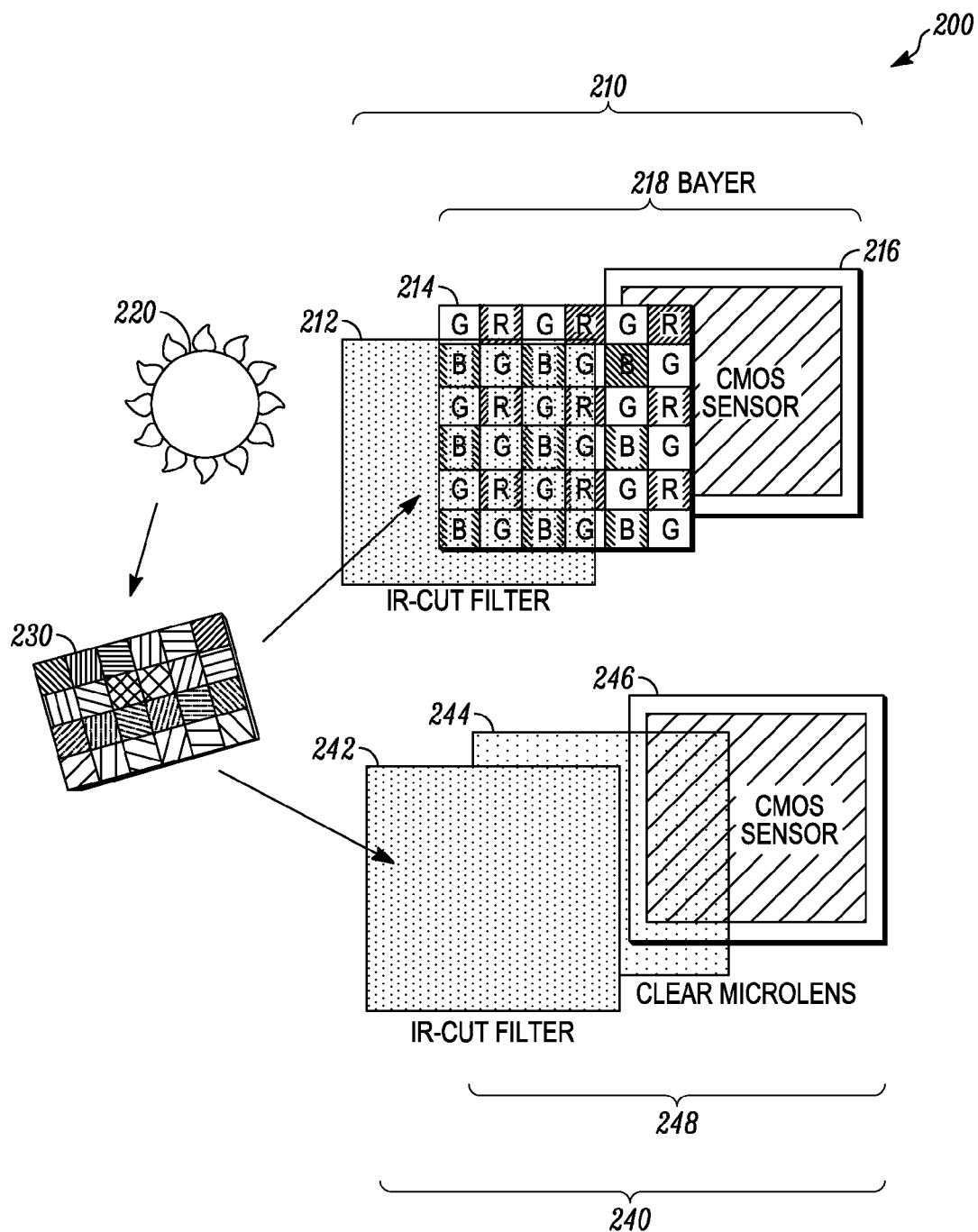
FIG. 2 is an example illustration of simulation model for light received on a dual camera system according to a possible embodiment.

FIG. 2 is an example illustration of simulation model 200 for light received on a dual camera system including a first camera unit 210 and a second camera unit 240, each which can be part of an apparatus, such as the apparatus 110, according to a possible embodiment. The first camera unit 210 can include an infrared-cut (IR-cut) filter 212, a Bayer Red, Green, and Blue (RGB) pixel pattern 214, and a sensor 216. While shown separately, the RGB pixel pattern 214 can be part of the sensor 216 and when combined, the RGB pixel pattern 214 and the sensor 216 can be considered an RGB Bayer sensor 218. The second camera unit 240 can include an infrared-cut (IR-cut) filter 242, a clear microlens 244, and a sensor 246. While shown separately, the clear microlens 244 can be part of the sensor 246 and when combined, the clear microlens 244 and the sensor 246 can be considered a panchromatic sensor 248. The camera units 210 and 240 and/or an apparatus, such as the apparatus 110, including the camera units 210 and 240 can also include other elements, such as the lens 130, the controller 150, and the memory 120. The simulation model 200 can also include an illuminant 220, such as a light source, and a subject 230, such as a subject in a scene.

According to an example embodiment using the CIE XYZ color space and the simulation model 200, images from each camera unit 210 and 240 can be acquired using a D65 light source as the light source 220. Thus, the color temperature of the scene can be known as 6500 K. Demosaicing can be applied to the RGB Bayer image from the camera unit 210 and a demosaicked image with three channels, such as Red, Green, and Blue, per pixel can be generated. The measured set of white balance gains at 6500 K for the Bayer camera unit 210 can be applied to RGB channels per pixel of the demosaicked image, respectively. A parallax detection algorithm or a stereo matching algorithm can be applied to the demosaicked image and the panchromatic image, and a merged image can be generated. Every pixel on this merged image can have four channels: Red, Green, Blue, and Clear (RGBC). A CIE XYZ color space can be used for this example, so the intensity level in the clear channel from the panchromatic sensor 246 can be the luminance channel, such as Y of CIE XYZ, at D65. The values of the RGB channels can be converted to CIE XYZ per pixel with white point of D65 light source. The values of RGB channels can be at linear gamma domain. Therefore, the color space conversion in this example can be from linear RGB to CIE XYZ with white point of D65 light source. The ratio in the luminance channels, such as in CIE XYZ, can be calculated per pixel between the intensity level of the clear channel and the value of CIE Y channel, from the color space conversion of linear RGB to CIE XYZ. This ratio can then be used to scale the value in chrominance channels, such as X and Z in CIE XYZ. The values in the Clear channel can be used per pixel for the luminance channel, such as Y in CIE XYZ, and the scaled values can be used for the chrominance channels, such as X and Z in CIE XYZ. The values can be converted from CIE XYZ to linear RGB with white point of D65, based on the known color temperature of the scene, which can result in a fusion image with 3 channels, such as Red, Green, and Blue, per pixel According to a related embodiment, white balance gains can be applied to the RGB Bayer image before demosaicing to generate a fusion image. For example, a pair of images can be acquired at D65, which gives the color temperature of the scene as 6500 K. A set of white balance gains at 6500 K for the Bayer camera unit 210 can be measured and applied to Red, Green, and Blue pixels of a Bayer image, respectively. Demosaicing can be applied to the white balanced Bayer image. Every pixel of the output image of demosaicing can have three channels: Red, Green, and Blue. A parallax detection algorithm or a stereo matching algorithm can be applied to the demosaicked image and the panchromatic image and a merged image can be generated. Every pixel on this merged image can have four channels: Red, Green, Blue, and Clear (RGBC). The CIE XYZ color space can be used for this experiment, so the intensity level in clear channel from the panchromatic sensor 246 can be the luminance channel, such as Y of CIE XYZ at D65. The values of the RGB channels can be converted to CIE XYZ per pixel with a white point of the D65 light source. The values of RGB channels can be in the linear gamma domain. Therefore, the color space conversion can be from linear RGB to CIE XYZ with a white point of the D65 light source. Per pixel, the ratio in the luminance channel, such as Y in CIE XYZ, between the luminance channel from the panchromatic sensor 246 and the luminance channel from RGB conversion can be calculated. Then, this ratio can be used to scale the values in chrominance channels, such as X and Z in CIE XYZ. Per pixel, the value in the clear channel can be used for the luminance channel, such as Y in CIE XYZ, and the scaled values can be used for the chrominance channels, such as X and Z in CIE XYZ. The values from CIE XYZ can be converted back to linear RGB with a white point of D65, based on the known color temperature of the scene, which can result in a fusion image with three channels, such as Red, Green, and Blue, per pixel.

Figure 3:
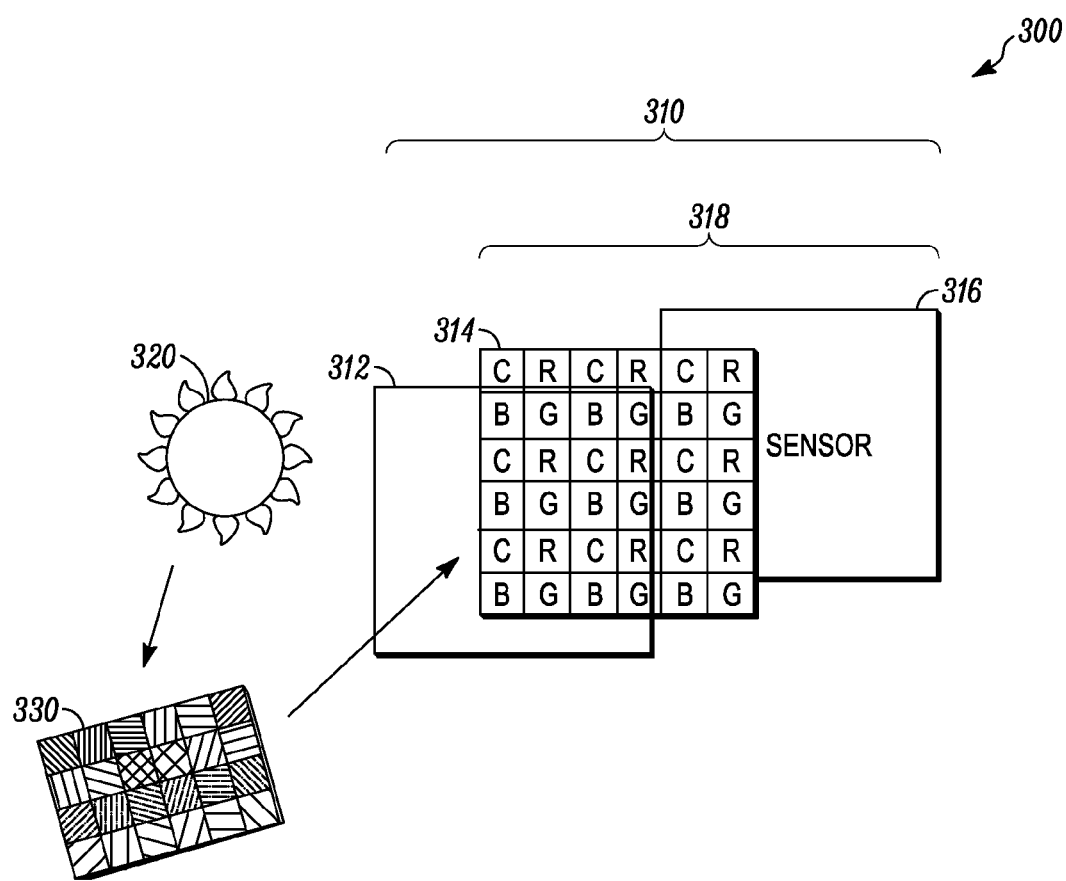
FIG. 3 is an example illustration of simulation model for light received on a camera unit according to a possible embodiment.

FIG. 3 is an example illustration of simulation model 300 for light received on a camera unit 310, such as the camera unit 120, according to a possible embodiment. The camera unit 310 can include an infrared-cut (IR-cut) filter 312, a Red, Green, Blue, and Clear (RGBC) pixel pattern 314, and a sensor 316. The camera unit 310 and/or an apparatus, such as the apparatus 110, including the camera unit 310 can also include other elements, such as the lens 130, the controller 150, and the memory 160. While shown separately, the RGBC pixel pattern 314 can be part of the sensor 316 and when combined, the RGBC pixel pattern 314 and the sensor 316 can be considered an RGBC sensor 318. A clear (C) pixel can be equivalent to a panchromatic pixel. The RGBC pixel pattern 330 can also be any other pixel pattern that includes chromatic and panchromatic pixels. The simulation model 300 can also include an illuminant 320, such as a light source, and a subject 330, such as a subject in a scene.

Figure 4:
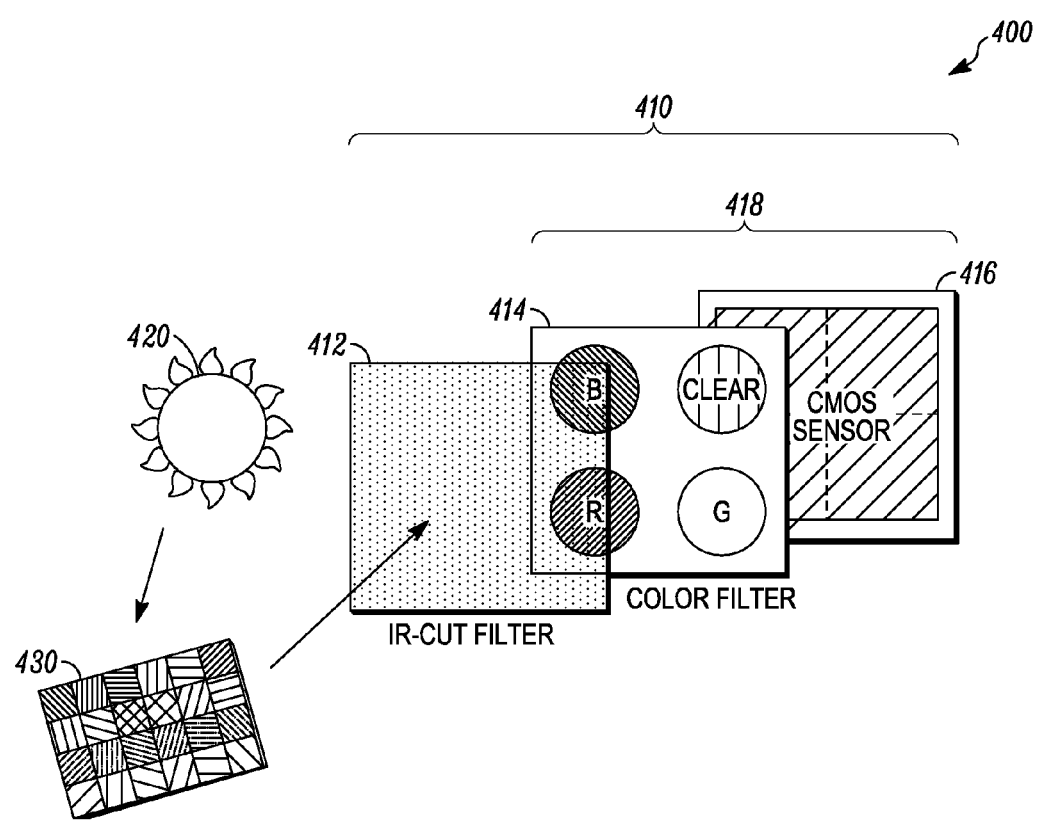
FIG. 4 is an example illustration of simulation model for light received on a 2×2 array camera unit according to a possible embodiment.

FIG. 4 is an example illustration of simulation model 400 for light received on a 2×2 array camera unit 410, such as the camera unit 120, according to a possible embodiment. The camera unit 410 can include an infrared-cut (IR-cut) filter 412, a color filter 414, and a sensor 416. The camera unit 410 and/or an apparatus, such as the apparatus 110, including the camera unit 410 can also include other elements, such as the lens 130, the controller 150, and the memory 160. The color filter 414 can be separate from the sensor 416. Alternately, the color filter 414 and the sensor 416 can be considered a combined component of a 2×2 array sensor 418. Pixels on the sensor 416 behind the clear filter can be considered a clear (C) pixel, which can be equivalent to a panchromatic pixel. For the 2×2 array camera unit 410, the sensor 416 can be divided into quadrants, where the pixels in a given quadrant can receive light through one of the R, G, B, or C filters in the color filter 414. The simulation model 400 can also include an illuminant, such as a light source, 420 and a subject 430, such as a subject in a scene.

For both the simulation models 300 and 400, before the color interpolation, each pixel can have intensity levels of 4 channels (RGBC) through demosaic for the RGBC sensor 318, or stereo matching for the 2×2 array sensor 418. Then, per pixel, white balance gains can be applied to the values of RGB channels. Then, the procedures of color interpolation can be exactly the same as those steps for the dual camera system in the simulation model 200.

If a gamma correction has been applied to the values of RGBC channels, before the color interpolation. Then, an additional step can be used before the standard procedures, which can be to reverse the gamma correction. The purpose can be to convert the values of RGBC channels from a non-linear gamma domain to a linear gamma domain. Then, the values of RGBC channels can be converted to RGB channels in a linear gamma domain.

Figure 5:
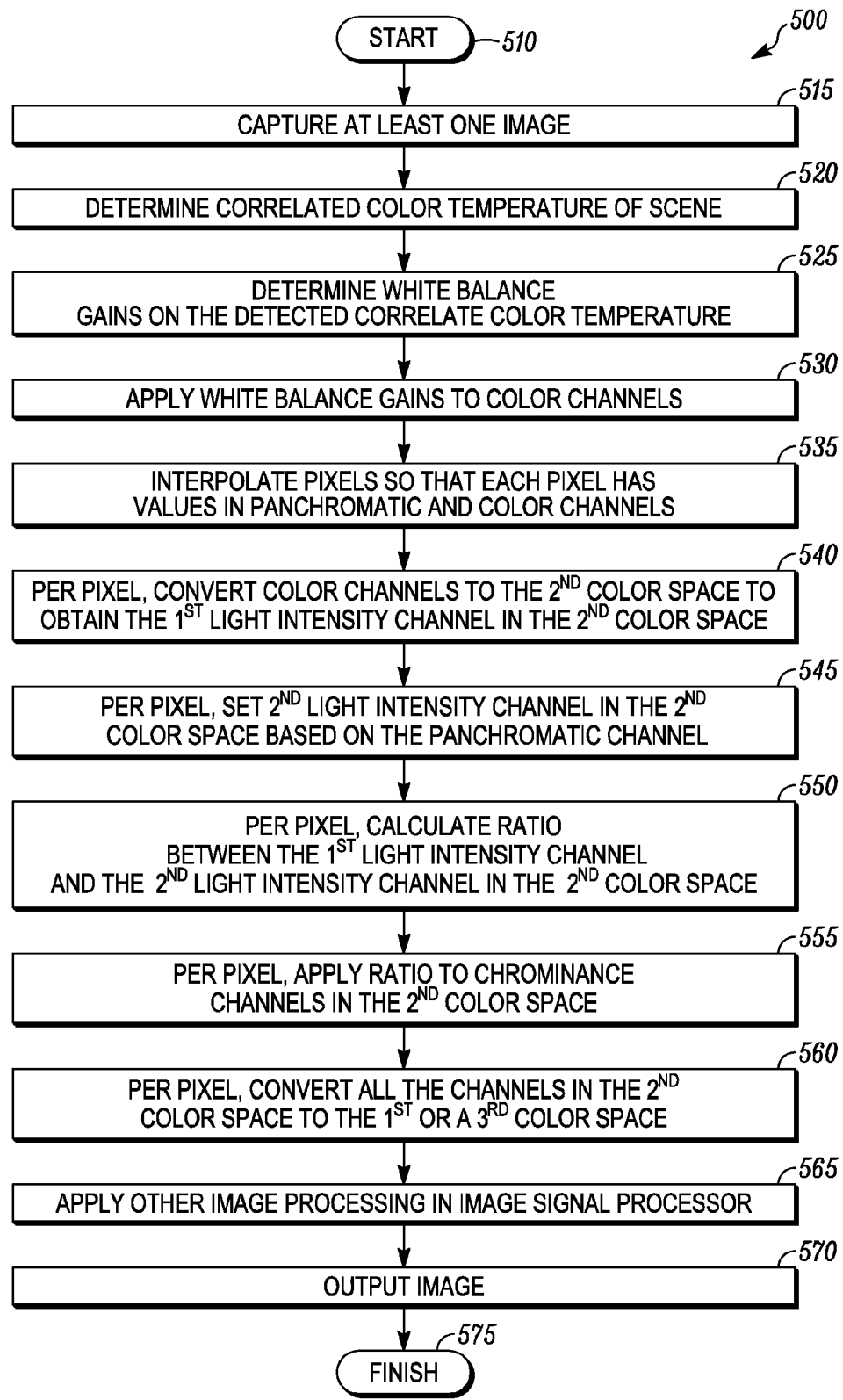
FIG. 5 is an example flowchart illustrating the operation of a camera device according to a possible embodiment.

FIG. 5 is an example flowchart 500 illustrating the operation of a camera device, such as the apparatus 110, according to a possible embodiment. At 510, the flowchart 500 can begin. At 515, at least one image of a scene can be captured using chromatic pixels that use a first color space and using panchromatic pixels, where the chromatic pixels and the panchromatic pixels can be on at least one image sensor. A color space can be a specific organization of colors. In combination with physical device profiling, a color space can allow for reproducible representations of color in both analog and digital representations. The image of the scene can include four data channels comprising a red channel, a green channel, a blue channel, and a panchromatic channel. According to another possible implementation, the image of the scene can include data channels comprising a cyan channel, a magenta channel, a yellow channel, and a panchromatic channel. The image of the scene can also include other types of channels.

At 520, a correlated color temperature of the scene can be determined, such as detected. Example correlated color temperatures can include 6500 K for sunlight, 4000 K for indoor office lighting, or 2800 K for Halogen lamps in a restaurant, and other correlated color temperatures of a scene. At 525, white balance gains of color channels in the first color space can be determined based on the detected correlated color temperature. At 530, the white balance gains can be applied to the color channels in the first color space.

At 535, pixels can be interpolated so that each pixel has values in panchromatic and color channels. For example, chromatic pixel values of the chromatic pixels and a panchromatic pixel value of the panchromatic pixels can be interpolated per pixel to generate a merged image including at least three color channels in the first color space and a panchromatic channel in the first color space. Interpolating the chromatic pixel values and the panchromatic pixel value per pixel can be performed before or after applying the white balance gains at 530. This can be done using another related image processing pipeline. Interpreting can include demosaicing, sometimes also spelled as demosaicking, that can interpolate pixel values of four channels, such as R, G, B, and C channels, per pixel from the chromatic pixels and panchromatic pixels. This step can result in one merged image, and each pixel can have channels, such as R, G, B, and C channels. As another example, in a dual camera systems with a color camera and a panchromatic camera, demosaicing can interpolate pixel values from the color camera and a parallax detection algorithm can merge the demosaiced image with the panchromatic image. As a further example, a 2×2 or more array camera system can use a parallax detection algorithm to generate a merged image including the chromatic and panchromatic channels.

At 540, the at least three color channels of the first color space can be converted to a first panchromatic light intensity channel in a second color space and at least two first chrominance channels in the second color space based on the detected correlated color temperature. A panchromatic light intensity channel can be a brightness channel, a luminance channel, a lightness channel, or any other panchromatic light intensity channel. For example, the panchromatic light intensity channel can be a luminance channel, such as Y in CIE XYZ or CIE Yuv, can be a brightness channel that is sometimes described as a lightness channel, such as L* in CIE L*a*b* or CIE L*C*H*, or can be any other panchromatic light intensity channel. As a further example, the second color space can be a CIE XYZ, CIE Yuv, CIE L*a*b*, CIE L*C*H* space or any other useful color space. The first color space can be an RGB color space based on a color model, a CMY color space, a color space including at least three chromatic channels, a color space including more than three chromatic channels, or any other color space that can be captured by an image sensor. For example, a color space, called an RGB or linear RGB color space, can include chromatic pixels acquired by the sensor. A clear channel, such as a channel including panchromatic pixels, can be an extra element that can be merged into the original chromatic pixels (R, G, B) per pixel, which can be used to generate new chromatic pixel values (R',G',B') per pixel. The second color space can be a medium that can be used to achieve this goal. Converting the at least three color channels can include converting the at least three color channels of the first color space to a first panchromatic light intensity channel in the second color space based on intensity levels in color channels with the white balance gains and at least two first chrominance channels in a second color space based on the detected correlated color temperature.

At 545, a second panchromatic light intensity channel in the second color space can be set based on an intensity level of the panchromatic value per pixel. At 550, a ratio per pixel between the first panchromatic light intensity channel in the second color space and the second panchromatic light intensity channel in the second color space can be calculated, where the second panchromatic light intensity channel can be based on the panchromatic value per pixel.

At 555, the ratio can be applied to the at least two first chrominance channels per pixel to determine pixel values in at least two second chrominance channels of the second color space. Applying the ratio can include scaling values of the at least two chrominance channels in the second color space per pixel based on the ratio per pixel and setting the scaled values of the at least two chrominance channels per pixel as pixel values in the at least two chrominance channels per pixel in the second color space.

At 560, channels per pixel can be converted from the second color space including the at least two second chrominance channels and the second panchromatic light intensity channel to the first color space and/or a third color space. The third color space can be the same as the first color space or can be any color space. For example, the third color space can be a YCbCr color space including a luminance channel, Y, and two chrominance channels, Cb and Cr. The third color space can also be the other color spaces described in other embodiments. According to possible embodiments, three color spaces can be involved in this operation. For example, RAW data from a camera sensor can acquire color values in the first color space. A second color space can be used as an intermediate color space for the color interpolation processing. Then, the color values in the second color space can be converted back to the first color space or a third color space for the downstream image processing. The third color space can be a color space based on an RGB color model, such as the first color space, a YCbCr color space, such as a data format for JPEG image encoding, or any other color space useful for outputting an image. According to a possible implementation, the channels can first be converted to an RGB color space and then converted to a YCbCr color space from the RGB color space for JPEG encoding. At 565, other image signal processing in an image signal processor can be applied to an image including the converted channels.

At 570, an image including the converted channels with any additional image signal processing can be output. For example, the image can be output to memory, to a display, to a printer, over a network interface, such as to a printer, via a transceiver, or by any other means for outputting an image. A file including the converted channels can also be converted into another file format, such as JPEG for display or storage. At 575, the flowchart 500 can end.

Figure 6:
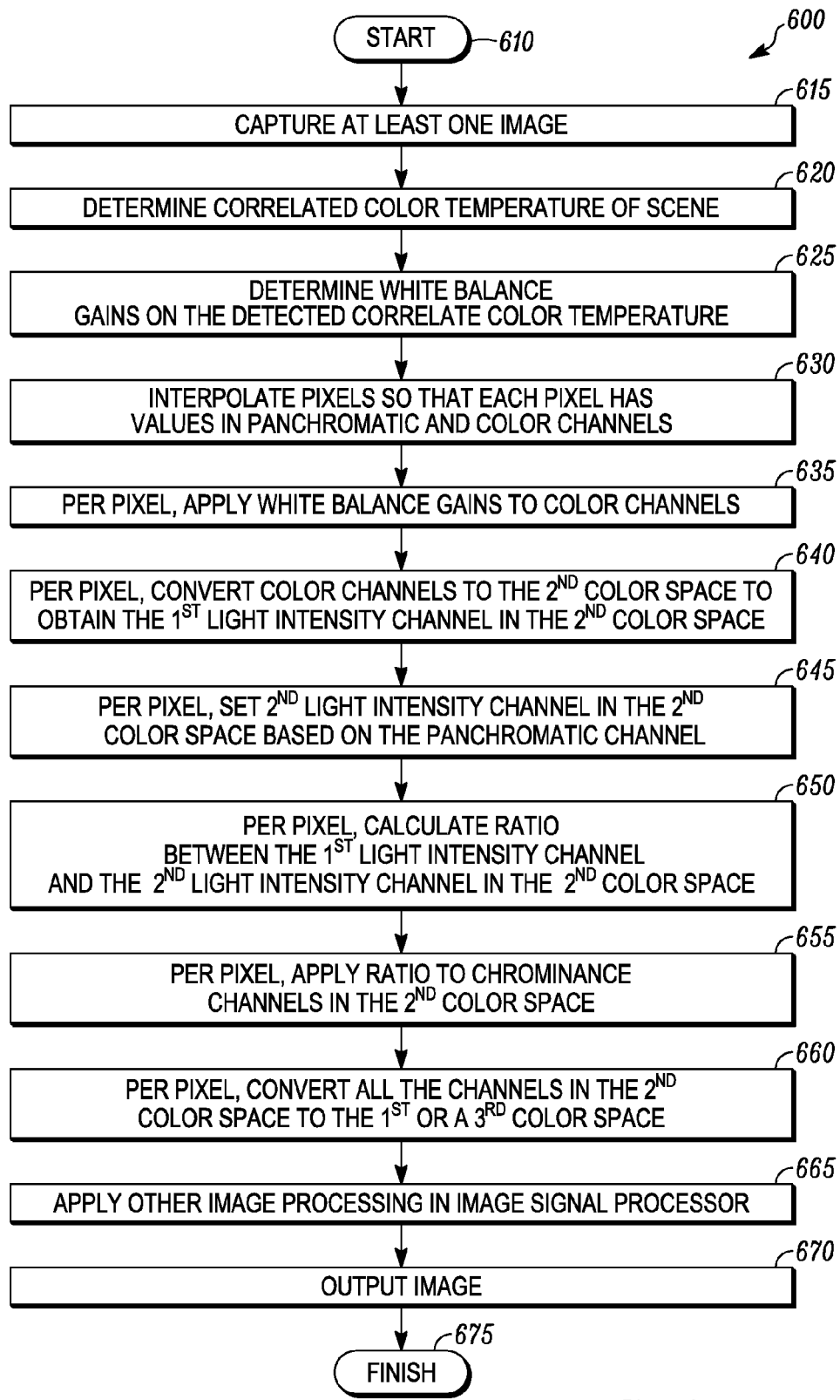
FIG. 6 is an example flowchart illustrating the operation of a camera device according to a possible embodiment.

FIG. 6 is an example flowchart 600 illustrating the operation of a camera device, such as the apparatus 110, according to a possible embodiment. At 610, the flowchart 600 can begin. At 615, at least one image of a scene can be captured using chromatic pixels that use a first color space and using panchromatic pixels, where the chromatic pixels and the panchromatic pixels can be on at least one image sensor.

At 620, a correlated color temperature of the scene can be determined, such as detected. At 625, white balance gains of color channels in the first color space can be determined based on the detected correlated color temperature. At 630, pixels can be interpolated so that each pixel has values in panchromatic and color channels. For example, chromatic pixel values of the chromatic pixels and a panchromatic pixel value of the panchromatic pixels can be interpolated per pixel to generate a merged image including at least three color channels in the first color space and a panchromatic channel in the first color space. At 635, the white balance gains can be applied to the color channels in the first color space per pixel.

At 640, the at least three color channels of the first color space can be converted to a first panchromatic light intensity channel in a second color space and at least two first chrominance channels in the second color space based on the detected correlated color temperature. Converting the at least three color channels can include converting the at least three color channels of the first color space to a first panchromatic light intensity channel in the second color space based on intensity levels in color channels with the white balance gains and at least two first chrominance channels in a second color space based on the detected correlated color temperature.

At 645, a second panchromatic light intensity channel in the second color space can be set based on an intensity level of the panchromatic value per pixel. At 650, a ratio per pixel between the first panchromatic light intensity channel in the second color space and the second panchromatic light intensity channel in the second color space can be calculated, where the second panchromatic light intensity channel can be based on the panchromatic value per pixel.

At 655, the ratio can be applied to the at least two first chrominance channels per pixel to determine pixel values in at least two second chrominance channels of the second color space. Applying the ratio can include scaling values of the at least two chrominance channels in the second color space per pixel based on the ratio per pixel and setting the scaled values of the at least two chrominance channels per pixel as pixel values in the at least two chrominance channels per pixel in the second color space.

At 660, all channels per pixel can be converted from the second color space including the at least two second chrominance channels and the second panchromatic light intensity channel to the first color space and/or a third color space. At 665, other image signal processing in an image signal processor can be applied to an image including the converted channels.

At 670, an image including the converted channels with any additional image signal processing can be output. For example, the image can be output to memory, to a display, to a printer, over a network interface, such as to a printer, via a transceiver, or by any other means for outputting an image. A file including the converted channels can also be converted into another file format, such as JPEG for display or storage. At 670, the flowchart 600 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
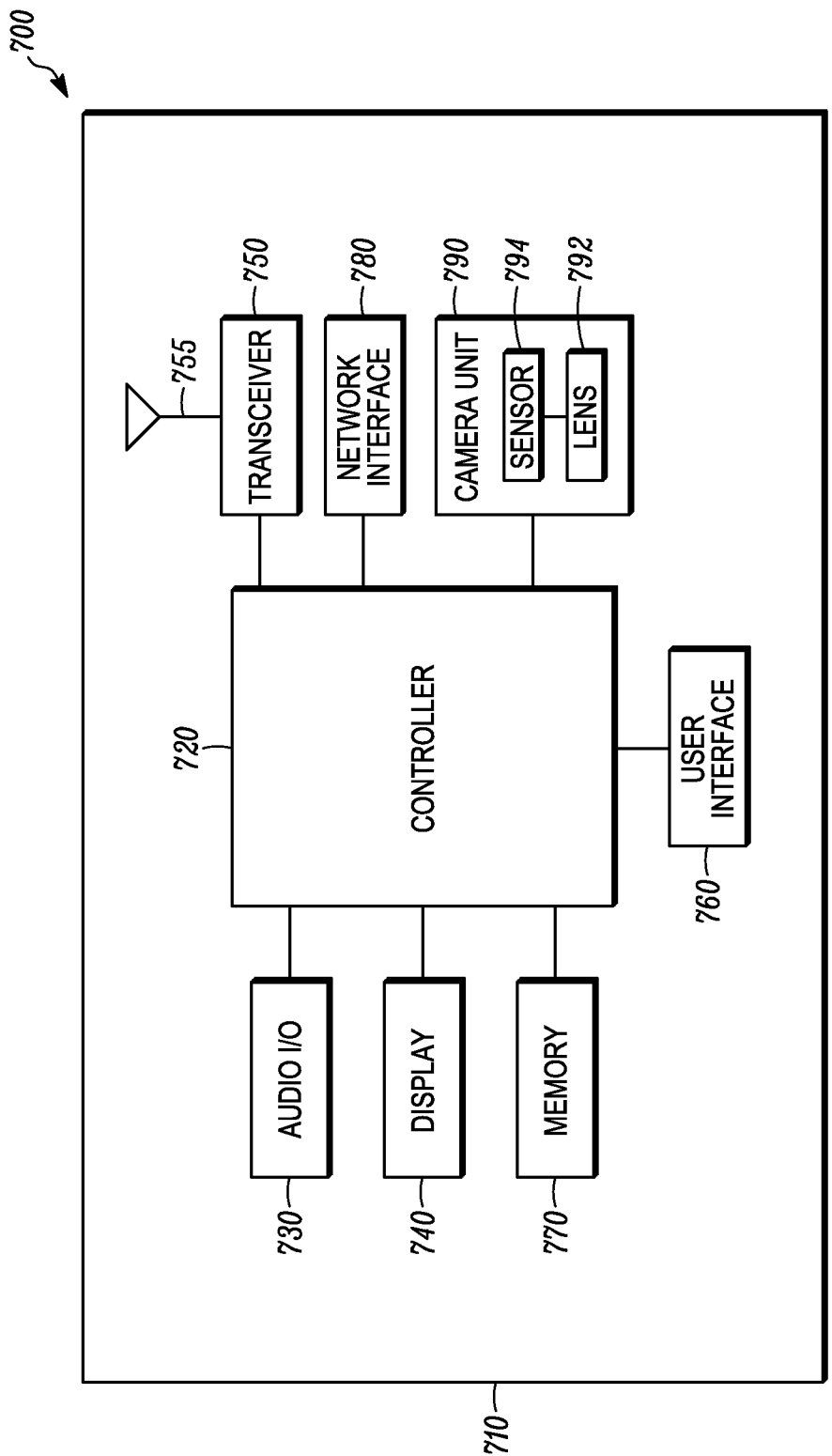
FIG. 7 is an example block diagram of an apparatus according to a possible embodiment.

FIG. 7 is an example block diagram of an apparatus 700, such as the apparatus 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can also include at least one camera 790, such as the camera unit 120, the camera units 210 and 240, the camera unit 310, the camera unit 410, and/or any other camera or camera unit. The camera 790 can include a lens 792 and a sensor 794. The apparatus 700 does not require all of the elements shown depending on the implementation of the apparatus 700, such as on a standalone camera vs. a smartphone. The apparatus 700 can perform the methods described in all the embodiments.

The display 740 can include multiple displays and can be a viewfinder, a liquid crystal display (LCD), a light emitting diode (LED) display, a plasma display, a projection display, a touch screen, an LED flash, or any other device or combination of devices that display information and/or output light. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1396 port, a WLAN transceiver, or any other interface that can connect an apparatus to a network, device, or computer and that can transmit and receive data communication signals.

The memory 770 can include a random access memory, a read only memory, an optical memory, a flash memory, a removable memory, a hard drive, a cache, or any other memory that can be coupled to a camera device.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, cloud computing, hardware/electronic logic circuits, such as a discrete element circuit, a programmable logic device, such as a programmable logic array, field programmable gate-array, or the like. In general, the controller 720 may be any controller or processor device or devices capable of operating a camera device and implementing the disclosed embodiments. As further examples, the controller can include a processor, can include an image signal processor, can include pixel color interpolation logic, can include software, can include hardware, and/or can include or be any other controller that is capable of performing the operations disclosed in the embodiments.

In operation, the sensor 794 can capture at least one image of a scene using chromatic pixels and panchromatic pixels. The controller 720 can detect a correlated color temperature of the scene. The controller 720 can determine white balance gains of color channels in the first color space based on the detected correlated color temperature. The controller 720 can apply the white balance gains to the color channels in the first color space per pixel. The controller 710 can apply the white balance gains to the color pixels per pixel before or after interpolating chromatic pixel values of the chromatic pixels and a panchromatic pixel value of the panchromatic pixels per pixel.

The controller 720 can interpolate chromatic pixel values of the chromatic pixels and a panchromatic pixel value of the panchromatic pixels per pixel to generate a merged image including at least three color channels in the first color space and a panchromatic channel in the first color space. The controller 720 can convert the at least three color channels of the first color space to a first panchromatic light intensity channel in a second color space and at least two first chrominance channels in the second color space based on the detected correlated color temperature. The controller 720 can convert the at least three color channels by converting the at least three color channels of the first color space to a first panchromatic light intensity channel in the second color space based on intensity levels in color channels with the white balance gains and at least two first chrominance channels in a second color space based on the detected correlated color temperature.

The controller 720 can set a second panchromatic light intensity channel in the second color space based on an intensity level of the panchromatic value per pixel. The controller 720 can calculate a ratio per pixel between the first panchromatic light intensity channel in the second color space and the second panchromatic light intensity channel in the second color space, where the second panchromatic light intensity channel can be based on the panchromatic value per pixel.

The controller 720 can apply the ratio to the at least two first chrominance channels per pixel to determine pixel values in at least two second chrominance channels of the second color space. The controller 720 can apply the ratio by scaling values of the at least two chrominance channels in the second color space per pixel based on the ratio per pixel, and setting the scaled values of the at least two chrominance channels per pixel as pixel values in the at least two chrominance channels per pixel in the second color space.

The controller 720 can convert channels per pixel from the second color space including the at least two second chrominance channels and the second panchromatic light intensity channel to the first color space and/or a third color space. An output, such as the display 740, the network interface 780, such as a USB port for a connection to a printer, the transceiver 750, a bus from the controller 720 to the memory 770, or any other means for outputting an image, can output an image including the converted channels.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   capturing at least one image of a scene using chromatic pixels that use a first color space and using panchromatic pixels, the chromatic pixels and the panchromatic pixels being on at least one image sensor;
   detecting a correlated color temperature of the scene;
   interpolating chromatic pixel values of the chromatic pixels and a panchromatic pixel value of the panchromatic pixels per pixel to generate a merged image including at least three color channels in the first color space and a panchromatic channel in the first color space;
   converting the at least three color channels of the first color space to a first panchromatic light intensity channel in a second color space and at least two first chrominance channels in the second color space based on the detected correlated color temperature;
   calculating a ratio per pixel between the first panchromatic light intensity channel in the second color space and a second panchromatic light intensity channel in the second color space, where the second panchromatic light intensity channel is based on the panchromatic value per pixel;
   applying the ratio to the at least two first chrominance channels per pixel to determine pixel values in at least two second chrominance channels of the second color space; and
   converting channels per pixel from the second color space including the at least two second chrominance channels and the second panchromatic light intensity channel to at least one of the first color space and a third color space.

2. The method according to claim 1, further comprising:
   determining white balance gains of color channels in the first color space based on the detected correlated color temperature; and
   applying the white balance gains to the color channels in the first color space per pixel,
   wherein converting the at least three color channels comprises converting the at least three color channels of the first color space to a first panchromatic light intensity channel in the second color space based on intensity levels in color channels with the white balance gains and at least two first chrominance channels in a second color space based on the detected correlated color temperature.

3. The method according to claim 1, further comprising:
   determining white balance gains of color channels in the first color space based on the detected correlated color temperature; and
   applying the white balance gains to the color pixels per pixel prior to interpolating.

4. The method according to claim 1, further comprising setting the second panchromatic light intensity channel in the second color space based on an intensity level of the panchromatic value per pixel.

5. The method according to claim 4, wherein applying the ratio comprises:

scaling values of the at least two chrominance channels in the second color space per pixel based on the ratio per pixel; and setting the scaled values of the at least two chrominance channels per pixel as pixel values in the at least two chrominance channels per pixel in the second color space.

6. The method according to claim 1, further comprising outputting an image including the converted channels.

7. The method according to claim 1, wherein the image of the scene includes four data channels comprising a red channel, a green channel, a blue channel, and a panchromatic channel.

8. The method according to claim 1, wherein the image of the scene includes data channels comprising a cyan channel, a magenta channel, a yellow channel, and a panchromatic channel.

9. The method according to claim 1, wherein the third color space comprises a YCbCr color space including a luminance channel, Y, and two chrominance channels, Cb and Cr.

10. An apparatus comprising:
at least one a sensor including chromatic pixels that use a first color space and panchromatic pixels, the sensor configured to capture at least one image of a scene using the chromatic pixels and the panchromatic pixels;
a controller coupled to the at least one sensor, the controller configured to
detect a correlated color temperature of the scene,
interpolate chromatic pixel values of the chromatic pixels and a panchromatic pixel value of the panchromatic pixels per pixel to generate a merged image including at least three color channels in the first color space and a panchromatic channel in the first color space,
convert the at least three color channels of the first color space to a first panchromatic light intensity channel in a second color space and at least two first chrominance channels in the second color space based on the detected correlated color temperature,
calculate a ratio per pixel between the first panchromatic light intensity channel in the second color space and a second panchromatic light intensity channel in the second color space, where the second panchromatic light intensity channel is based on the panchromatic value per pixel,
apply the ratio to the at least two first chrominance channels per pixel to determine pixel values in at least two second chrominance channels of the second color space, and
convert channels per pixel from the second color space including the at least two second chrominance channels and the second panchromatic light intensity channel to at least one of the first color space and a third color space.

11. The apparatus according to claim 10, wherein the controller is configured to
determine white balance gains of color channels in the first color space based on the detected correlated color temperature,
apply the white balance gains to the color channels in the first color space per pixel,
convert the at least three color channels by converting the at least three color channels of the first color space to a first panchromatic light intensity channel in the second color space based on intensity levels in color channels with the white balance gains and at least two first chrominance channels in a second color space based on the detected correlated color temperature.

12. The apparatus according to claim 10, wherein the controller is configured to
determine white balance gains of color channels in the first color space based on the detected correlated color temperature, and
apply the white balance gains to the color pixels prior to interpolating chromatic pixel values of the chromatic pixels and a panchromatic pixel value of the panchromatic pixels per pixel.

13. The apparatus according to claim 10, wherein the controller is configured to set the second panchromatic light intensity channel in the second color space based on an intensity level of the panchromatic value per pixel.

14. The apparatus according to claim 13, wherein the controller is configured to apply the ratio by
scaling values of the at least two chrominance channels in the second color space per pixel based on the ratio per pixel, and
setting the scaled values of the at least two chrominance channels per pixel as pixel values in the at least two chrominance channels per pixel in the second color space.

15. The apparatus according to claim 10, further comprising an output configured to output an image including the converted channels.

16. The apparatus according to claim 10, wherein the image of the scene includes four data channels comprising a red channel, a green channel, a blue channel, and a panchromatic channel.

17. The apparatus according to claim 10, wherein the image of the scene includes data channels comprising a cyan channel, a magenta channel, a yellow channel, and a panchromatic channel.

18. The apparatus according to claim 10, wherein the third color space comprises a YCbCr color space including a luminance channel, Y, and two chrominance channels, Cb and Cr.

19. The apparatus according to claim 10, wherein the apparatus comprises a user portable communication device.

20. A method comprising:
capturing at least one image of a scene using chromatic pixels that use a first color space and using panchromatic pixels, the chromatic pixels and the panchromatic pixels being on at least one image sensor;
detecting a correlated color temperature of the scene;
determining white balance gains of color channels in the first color space based on the detected correlated color temperature;
applying the white balance gains to chromatic pixels;
interpolating the white balanced chromatic pixel values of the chromatic pixels and a panchromatic pixel value of the panchromatic pixels per pixel to generate a merged image including at least three color channels in the first color space and a panchromatic channel in the first color space;
converting the at least three color channels of the first color space to a first panchromatic light intensity channel in a second color space and at least two first chrominance channels in the second color space based on the detected correlated color temperature;
setting a second panchromatic light intensity channel in the second color space based on an intensity level of the panchromatic value per pixel;
calculating a ratio per pixel between the first panchromatic light intensity channel in the second color space and the second panchromatic light intensity channel in the second color space, where the second panchromatic light intensity channel is based on the panchromatic value per pixel;

scaling values of the at least two chrominance channels in the second color space per pixel based on the ratio per pixel;

setting the scaled values of the at least two chrominance channels per pixel as pixel values of the at least two chrominance channels per pixel in the second color space;

converting channels per pixel from the second color space including the at least two second chrominance channels and the second panchromatic light intensity channel to at least one of the first color space and a third color space; and outputting an image including the converted channels.

* * * * *